United States Patent
Beckerman et al.

(10) Patent No.: US 6,415,327 B1
(45) Date of Patent: *Jul. 2, 2002

(54) AUTOMATIC PROTOCOL ROLLOVER IN STREAMING MULTIMEDIA DATA DELIVERY SYSTEMS

(75) Inventors: Mike Beckerman, Redmond; Chadd B. Knowlton, Bellevue; Steven P. Levi; Mark VanAntwerp, both of Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,260

(22) Filed: Jan. 24, 2000

Related U.S. Application Data

(63) Continuation of application No. 09/037,199, filed on Mar. 3, 1998, now Pat. No. 6,029,200.

(51) Int. Cl.⁷ .............................................. G06F 15/16
(52) U.S. Cl. .................................... 709/231; 709/226
(58) Field of Search ................................ 709/231, 226, 709/224, 232, 237, 238

(56) References Cited

U.S. PATENT DOCUMENTS

| | | | |
|---|---|---|---|
| 5,859,852 A | 1/1999 | Moura et al. | 370/449 |
| 5,872,781 A | 2/1999 | Bennett et al. | 370/365 |
| 5,905,885 A | 5/1999 | Richter et al. | 710/5 |
| 5,917,816 A | 6/1999 | Jacobsohn | 370/352 |
| 5,936,960 A | 8/1999 | Stewart | 370/438 |
| 6,029,200 A * | 2/2000 | Beckerman et al. | 709/226 |
| 6,266,701 B1 * | 7/2001 | Sridhar et al. | 709/232 |
| 6,301,617 B1 * | 10/2001 | Carr | 709/227 |
| 6,324,582 B1 * | 11/2001 | Sridhar et al. | 709/230 |

OTHER PUBLICATIONS

"Server–less versus Server–based Video Streaming"—Internet Reference, HTTP://www.vxtreme.com/developers/wp970101.html, Jul. 9, 1997.

"Enabling Interactive Video Over the Internet"—Internet Reference, HTTP://vxtreme.com/develpers/wp960304.html, Jul. 9, 1997.

"Video Compression for the Internet"—Internet Reference, HTTP://vxtreme.com/develpers/wp970102.html, Jul. 9, 1997.

* cited by examiner

Primary Examiner—Zarni Maung
(74) Attorney, Agent, or Firm—Lee & Hayes, PLLC

(57) ABSTRACT

The invention includes a streaming multimedia rendering system having a network client and a network server that form part of a hyperlink web such as the Internet. In accordance with the invention, a hyperlink to multimedia content is actually an indirect link to a reference file. The reference file contains a plurality of different resource specifiers and a preferred order for attempting communications using the resource specifiers. Each resource specifier designates a transport protocol. A streaming data client open the resource file in response to activation of a hyperlink to the resource file. In response to the resource specifiers contained in the reference file, the network data client repeatedly attempts to establish a streaming data connection using the different resource specifiers, in the preferred order specified in the reference file, or in the preferred order specified by a file referenced by the reference file, until a streaming data connection is successfully established. Each attempt with a different resource specifier uses the transport protocol designated by that different resource specifier. Different types of protocol specifiers are available. Some of the protocol specifiers override configuration settings made at the network data client relating to which transport protocols are permitted.

30 Claims, 3 Drawing Sheets

[reference]
Ref1 = mmst://server1/vid.asf
Ref2 = mmsu://server2/vid.asf
Ref3 = http://server2/vid2.asf

AUTOMATIC PROTOCOL ROLLOVER IN STREAMING MULTIMEDIA DATA DELIVERY SYSTEMS

This is a continuation of U.S. patent application Ser. No. 09/037,199, filed Mar. 3, 1998, which is now U.S. Pat. No. 6,029,200.

TECHNICAL FIELD

This invention relates to streaming multimedia data delivery and rendering over hyperlinked networks such as the Internet.

BACKGROUND

Only a few years ago, the business world was full of text documents, and adding graphics to them was not easy. Now, the race is on to offer Internet Web sites that attract and retain visitors through the latest in graphics and animation. Audio-enabled and video-enabled Web sites and applications are the next wave. The integration of audio and video into applications such as online training, corporate communications, customer and sales support, news and entertainment services, and product promotions will provide individuals and organizations with new and exciting ways to communicate.

Currently, most of the audio and video content hosted on intranets and on Internet sites is downloadable. This means that the multimedia content must be copied to the user's local PC before it can be played. However, new technologies use data streaming techniques to deliver multimedia content. Streaming content is digitized content that has been compressed or encoded into a format that the server can break down into packets and then stream across a network to a client player. Streaming is a significant improvement over the download-and-play approach to multimedia file distribution because it allows content to be delivered to the client as a continuous flow of data with little waiting time before playback begins. The content arrives, is buffered briefly, plays, and is discarded. It is not stored on the users's computer. Users benefit by experiencing instant play—they do not have the frustration of waiting for content to download to determine whether it meets their needs or interests.

Streaming data architectures and systems include players that run on a users' computers to receive and render streaming multimedia content. In general, a player such as this can support any one or a number of different network transport protocols, including UDP/IP, TCP/IP, HTTP, RTP, and IP multicast. Such protocols vary in efficiency. For example, IP multicast is relatively efficient, since only a single copy of data is sent across the network, to multiple clients. The other protocols, which are unicast protocols, exhibit different degrees of efficiency.

It is desirable for a player to support several protocols, because certain protocols are often not available either within a network or across network boundaries. Specifically, network firewalls might block certain network transport protocols across network boundaries, while the same transport protocols might be available within individual networks. Some prior art players have the ability to try different protocols, either in parallel or in a predetermined order, until one or more streaming data connections are successfully established. This allows a client to determine which protocols are available, to choose the most efficient protocol when it is available, and to use a less efficient protocol when more efficient alternatives are not available. The most advantageous protocol is determined based on a predefined protocol priority.

One disadvantage of this method is that time is wasted while attempting to establish communications under protocols that are eventually found to be unavailable. However, clients using this method are generally configurable by a user so that certain transport protocols can be disabled permanently. This avoids the delay which otherwise results when a client unsuccessfully attempts to establish a streaming data connection using a protocol that the user knows to be unavailable.

Microsoft Corporation has developed a platform for streaming multimedia data over networks that range from low bandwidth dial-up Internet connections to high bandwidth switched local area networks. Using this product, which goes by the trademarked name NetShow, companies can offer new steaming content for applications such as training, corporate communications, entertainment, and advertising to users all over the world. NetShow is a powerful broadcast system that is easy to acquire and operate, and that empowers companies to offer rich, high-quality interactive content over today's networks.

A prior art version of NetShow (version 1.0) included features allowing streaming multimedia content to be easily embedded in hypertext and other hyperlink documents. To embed unicast content in a hyperlink document, a reference file was created having an "asx" filename extension. The reference file had a resource specifier in a standard URL (uniform resource locator) format of the form "mms://server/filespec.asf". The protocol specifier of the URL was always equal to "mms", which designated the UDP/IP unicast protocol—the single default transport protocol implemented by NetShow version 1.0.

To provide a link to unicast content from a hyperlink document, a hyperlink to the reference file was included in the hyperlink document. Activating the hyperlink from a network browser retrieved and opened the reference file. A NetShow player component was registered on the client and was used to open the reference file. The player then attempted to establish a streaming data connection with the network server specified by the resource specifier, using the UDP/IP transport protocol.

With the NetShow version 2.0 platform, multicast streaming or multimedia data was also supported. To use multicasting, the reference file was considered an "announcement." It contained a statement designating another, second reference file having an "nsc" filename extension, in addition to statements describing various attributes of the multimedia content. The second reference file includes resource specifiers used to find and access the UDP multicast source. The second reference file also included other information about the source of the streaming data.

The streaming multimedia delivery platform described below includes the ability for a client to specify multiple network transport protocols, and to attempt streaming data communications using those protocols in a predefined order. In addition, however, it provides the ability to automatically override a client's specified configuration, and to try different transport protocols in an order of preference that is established by a content provided. This is a valuable improvement over the prior art.

SUMMARY

In accordance with the invention, a hyperlink to multimedia content is actually an indirect link to a reference file. The reference file contains a plurality of different resource specifiers and a preferred order for attempting communications using the resource specifiers. Each resource specifier designates a transport protocol.

A streaming data client or player opens the resource file in response to activation of a hyperlink to the resource file. Then, the player repeatedly attempts to establish a streaming data connection using the different resource specifiers, in the preferred order specified in the reference file, unit 1 a streaming data connection is successfully established. Each attempt with a different resource specifier uses the transport protocol designated by that different resource specifier. Different types of protocol specifiers are available. Some of the protocol specifiers override configuration settings made at the network data client relating to which transport protocols are permitted.

DRAWINGS

DETAILED DESCRIPTION

Figure 1:
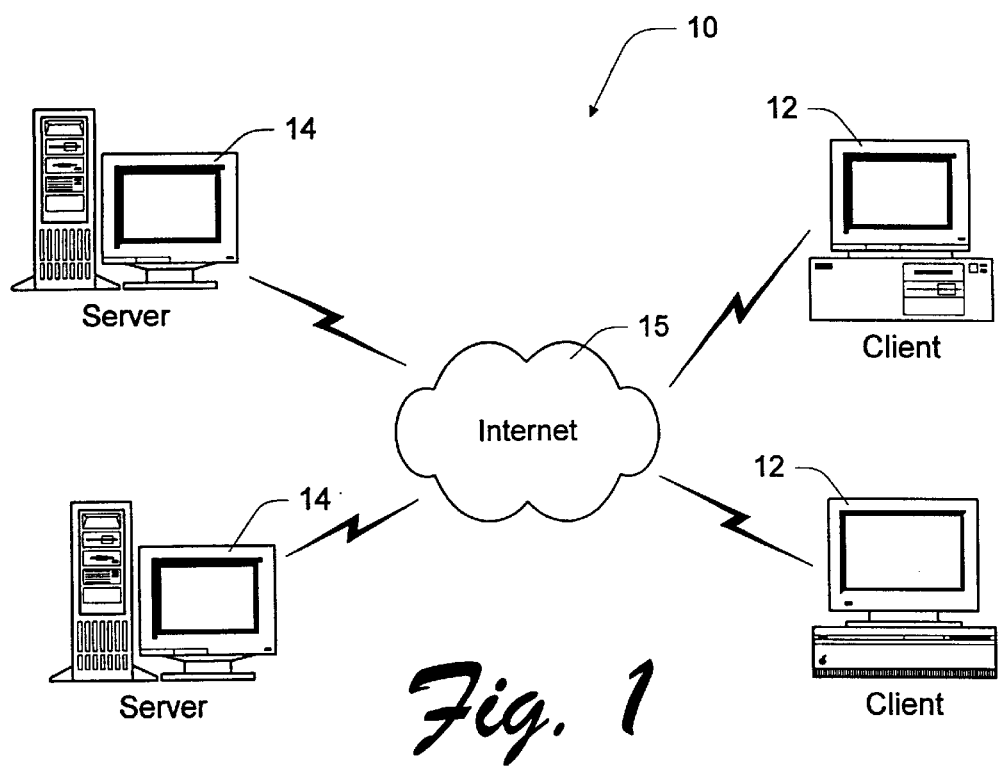
FIG. 1 shows a streaming multimedia rendering system and network in accordance with the invention.

FIG. 1 shows a streaming multimedia rendering system and network, generally designated by reference numeral 10. In the embodiment shown, the system is implemented over the public Internet, using the World Wide Web (WWW or Web) and its hyperlinking capabilities. The invention is applicable to other networks as well, although it is particularly suited to networks that are configured to allow hyperlinks. The description herein assumes a general knowledge of technologies relating to the Internet, and specifically of topics relating to file specification, file retrieval, streaming multimedia content, and hyperlinking technology.

System 10 includes a network clients 12 and one or more network servers 14, all of which are connected for data communications over the Internet 15. Each client and server is implemented as a personal computer or a similar computer of the type that is typically referred to as "IBM-compatible."

Figure 2:
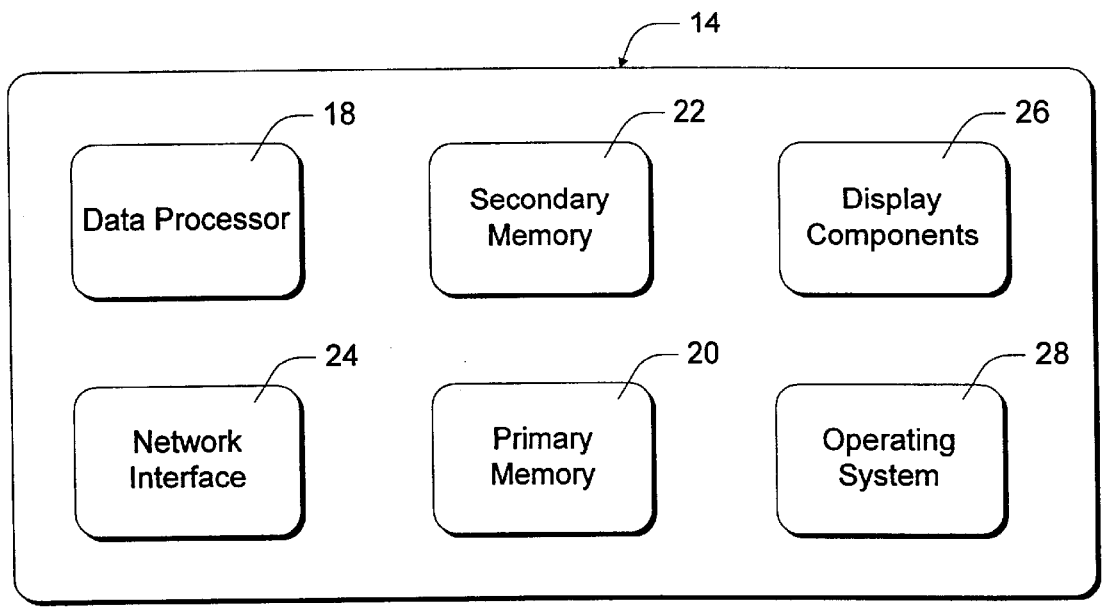
FIG. 2 is a block diagram of a network server in accordance with the invention.

An example of a server computer 14 is illustrated in block form in FIG. 2. It includes conventional components such as a data processor 18; volatile and non-volatile primary electronic memory 20; secondary memory 22 such as hard disks and floppy disks or other removable media; network interface components 24; display devices interfaces and drivers 26; and other components that are well known. The computer runs an operating system 28 such as the Windows NT operating system.

Network servers 14 and their operating systems are configured in accordance with known technology so that they are capable of streaming data connections with clients. The network severs support various network transport protocols, including multicast UDP/IP and unicast protocols such as UDP/IP, TCP/IP, and HTTP. The servers include storage components (such as secondary memory 22), on which various data files are stored, formatted appropriately for efficient transmission using the noted protocols. Compression techniques are preferably used to make the most efficient use of limited Internet bandwidth.

Figures 3, 4:
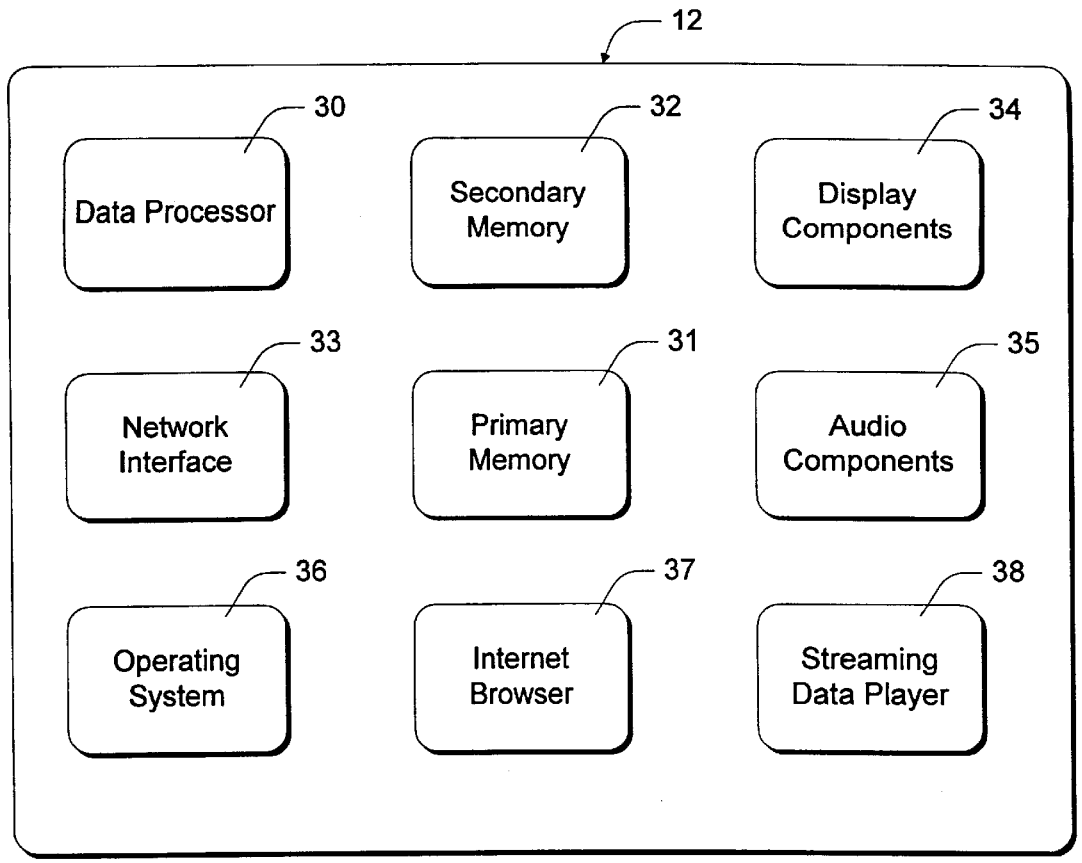
FIG. 3 is a block diagram of a client computer in accordance with the invention.
FIG. 4 shows a reference file in accordance with the invention.

FIG. 3 shows an example of a client computer 12. Various types of network clients can be utilized, such as palmtop computers, notebook computers, personal organizers, etc. Client computer 12 includes conventional components similar to those of network server 14, including a data processor 30; volatile and non-volatile primary electronic memory 31; secondary memory 32 such as hard disks and floppy disks or other removable media; network interface components 33; display devices interfaces and drivers 34; audio recording and rendering components 35; and other components as are common in personal computers.

In the case of both network server 14 and client computer 12, the data processors are programmed by means of instructions stored at different times in the various computer-readable storage media of the computers. Programs are typically distributed, for example, on floppy disks or CD-ROMs. From there, they are installed or loaded into the secondary memory of a computer. At execution, they are loaded at least partially into the computer's primary electronic memory. The invention described herein includes these various types of computer-readable storage media when such media contain instructions or programs for implementing the described steps in conjunction with a microprocessor or other data processor. The invention also includes the computer itself when programmed according to the methods and techniques described below.

For purposes of illustration, programs and program components are shown in FIGS. 2 and 3 as discrete blocks within a computer, although it is recognized that such programs and components reside at various times in different storage components of the computer.

Network client 12 is preferably configured with a consumer-oriented operating system such as one of Microsoft Corporation's Windows operating systems, referenced in FIG. 3 by numeral 36. In addition, network client 12 runs an Internet browser 37 such as Microsoft's Internet Explorer.

Network client 12 also includes a streaming multimedia data player or rendering component 38. This software component is capable of establishing streaming data connections with Internet servers or other servers, and of rendering the streaming data as audio or video. Specifically, player 38 is configured to open *.ask files (files having a filename extension of "asx"), or *.asf files (files having a filename extension of "asf"), and of establishing streaming data connections with the network resources specified in the *.asx files, or to the *.asf file, using the network transport protocols specified in the *.asx files, or in conjunction with the *.asf file. Both the *.asx files and the *.asf files are stored on computer-readable storage media of servers or other network sources.

Player 38 can be implemented as a standalone component or as an OCX control (OCX controls are standard features of programs designed for Windows operating systems). In either case, it is registered with the operating system so that it is invoked to open *.asx files and *.asf files in response to user requests. In the Windows operating system, such a user request is made by double-clicking on an icon representing a *.asx file or a *.asf file. From within an Internet browser, the request for a *.asx file is made by single-clicking on a hyperlink contained in a hyperlink document that is being displayed. When this happens, the player is loaded and executed, and the subject *.asx file is provided to the player as a run-time argument.

The *.asx files are referred to generically herein as reference files. Such files are made available from network servers 14, and are preferably integrated into the WWW. Hyperlinks to the reference files are placed in Web documents, and a user retrieves a particular reference file by clicking on its hyperlink. In response, the user's Internet browser retrieves the reference file from the server or other network source and opens it with player 38. Player 38, in turn, uses the reference file to establish a streaming data connection which the player then renders.

FIG. 4 shows an example reference file 40. Its first line consists simply of the string "[reference]". Following this line are one or a plurality of additional lines, each containing a different resource specifier in standard network URL format. The order of the resource specifiers establishes a preferred order for attempting communications with the resources specified by the resource specifiers. Each resource specifier is preceded by an identifier of the form "Ref#= URL". The # part of the identifier indicates the preferred order for attempting communications. For example, Ref1 is before Ref2. Alternatively, the reference file can specify the preferred order by referencing another file that in turn contains a specification of resources in their preferred order.

Each resource specifier designates a network resource and a protocol specifier. In accordance with this embodiment of the invention, there are three available explicit protocol specifiers, corresponding as follows to different transport protocols:

| | |
|---|---|
| mmsu | UDP/IP |
| mmst | TCP/IP |
| http | HTTP |

A plurality of different resource specifiers can be placed on different lines of a reference file, and each resource specifier can designate a different transport protocol.

When player 38 opens and reads a reference file, it responds by repeatedly attempting to establish a streaming data connection using the different resource specifiers in the preferred order specified by the reference file until a streaming data connection is successfully established. Each attempt using a different resource specifier uses the network resource and transport protocol specified by the resource specifier in accordance with the table above.

Consider the example of FIG. 3. The first resource specifier is "mmst://server1/vid.asf". In response to this statement, the player attempts to establish a streaming data connection to //server1/vid.asf using the TCP/IP transport protocol. The second resource specifier is "mmsu://server2/vid.asf". In response to this statement, the player attempts to establish a streaming data connection to //server2/vid.asf using the UDP/IP transport protocol. The third resource specifier is "http://server2/vid2.asf". In response to this statement, the player attempts to establish a streaming data connection to //server2/vid2. asf using the HTTP transport protocol.

Figure 5:
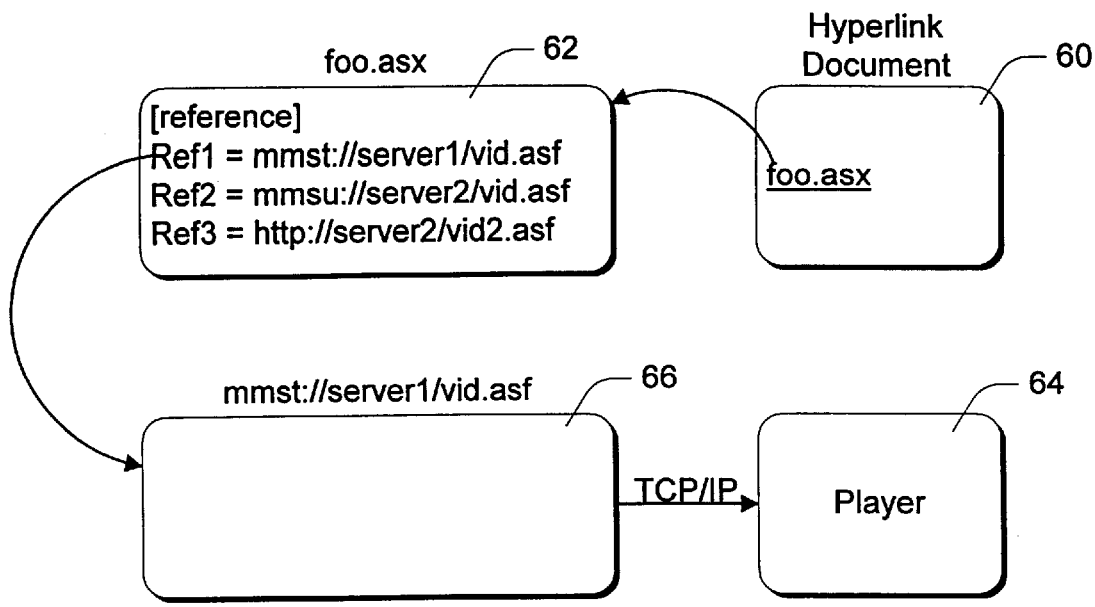
FIG. 5 illustrates the specification of a multimedia streaming data source in accordance with the invention.

FIG. 5 illustrates the indirection involved in establishing streaming data connections. A hypertext document 60 contains a hyperlink, the reference file is retrieved and provided to a streaming data client or player 64. Player 64 examines the reference file for its list of resource specifiers. Each resource specifier points to a potential source of streaming data content, and includes an appropriate transport protocol for use with the source. The player attempts to establish communications with the sources in the order they are specified, until a connection is successful. In the example, the TCP/IP connection is shown as being successful.

There is also a fourth available protocol specifier, "mms". A resource specifier that includes "mms" as its protocol specifier means that the player is to attempt streaming data communications with the specified network resource using the UDP/IP, TCP/IP, and HTTP protocols in that default order until a connection is successfully established. A resource specifier containing a protocol specifier having this predefined value ("mms") can be placed anywhere in the reference file, and connections will be attempted in the default order when this resource specifier is encountered.

Player 38 is configurable by its user to allow a selected subset of available transport protocols. Specifically, the player has a preference menu in which different transport protocols can be checked to indicate that they are to be used if available. An option is also provided so that the player will adopt whatever settings are allowed by a specified proxy server.

When the player encounters an "mms" protocol specification, it honors the user-set configuration—it skips any protocols that have not been checked by the user. When one of the three explicit protocol specifiers ("mmst", "mmsu", or "http") is encountered, however, the player overrides the selected subset of available transport protocols established by the user, and attempts a streaming connection using the designated transport protocol regardless of the client settings.

Figure 6:
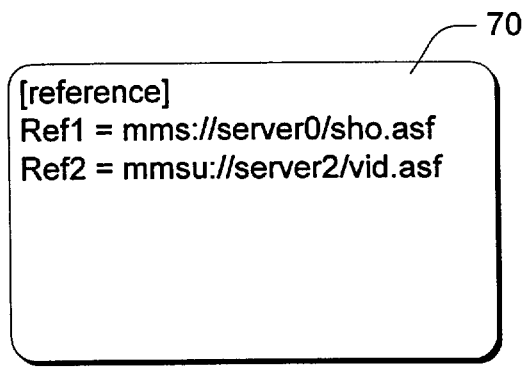
FIG. 6 illustrates a reference file in accordance with the invention.

FIG. 6 shows an example of a reference file 70 containing a resource specifier with an "mms" protocol specifier as well as other resource specifiers. Suppose in conjunction with this example that the client has configured player 38 to allow only the HTTP protocol. The first resource specifier in reference file 70 contains the "mms" protocol specifier, meaning that the client should try the UDP/IP, TCP/IP, and HTTP transport protocols, in that order. However, the mms protocol specifier does not override the user's settings, so HTTP is the only protocol attempted in response to the first resource specifiers. If this is not successful, the player responds to the next line which has a protocol specifier equal to "mmu". This indicates that the player is to try a UDP/IP connection regardless of the user preferences. Thus, the server can override the client settings, and sometimes force a connection even when the client settings would have prevented such a connection.

Broadcast or channel-type content can also be specified through reference files. Such content is similar to television, in that the viewer has no control over the timing of the content. It is sent at a specific time, and cannot be paused or restarted. Channel-type content is most efficiently sent by multicasting, but can also be sent using unicasting.

In the case of channel-type content, a first *.asx reference file contains the string "[announcement]" and a plurality of other lines indicating various attributes of the multicast content. The first reference file contains a single line of the form "Channel URL=http://server/name.nsc", specifying a second reference file having an "nsc" filename extension. The second reference file contains various statements specifying attributes of the multimedia source. In addition, it contains resource specifiers similar to those already described indicating an ordered sequence of sources and associated transport protocols. More specifically, the *.nsc file contains two optional lines indicating a multicast UDP/IP port and address. Resource specifiers as described above can also be provided to initiate unicast communications if multicasting is not specified or is not successful. Again, the explicit protocol specifiers (mmsu, mmst, and http) override the client configuration settings. The mms protocol specifier does not.

Although the invention has been described primarily in terms of its operational characteristics, the invention also includes general methodological steps that are performed in implementing the invention. One aspect of the invention is a method of hyperlinking network clients to streaming multimedia data content. In accordance with this aspect of the invention, a content author or administrator performs steps of creating one or more reference files as described above and putting hyperlinks to such reference files in hypermedia documents. The reference files serve as indirect links to actual content.

In accordance with other aspects of the invention, a step is performed of retrieving a resource reference or reference file from a network source. This is preferably performed in response to a user selection, such as activation of a hyperlink that specifies the reference file as its target. The reference file contains a plurality of different resource specifiers and a designated order for attempting communications using the resource specifiers. Each resource specifier designates a streaming data resource and an associated transport protocol.

A further step in accordance with the invention comprise repeatedly attempting to establish a streaming data connection using the different resource specifiers, in the designated order, until a streaming data connection is successfully established. Each attempt with a different resource specifiers uses the streaming data resource and the associated transport protocol designated by that different resource specifier. Once a connection has been successfully made, the player renders the received multimedia content in video and/or audio format.

If a particular resource specifier has a protocol specifier having a predefined value ("mms"), a step is performed of repeatedly attempting to establish a streaming data connection with the streaming data connection is successfully established. Each attempt uses a different transport protocol in a predetermined order or sequence that is not configurable by the user.

The invention also includes streaming data content and its related reference files, stored by servers and other network sources so that the content and reference files relate to each other as described above to provide the most efficient retrieval of streaming data.

The invention provides a capability that was not previously available; a network server can now provide streaming content with a degree of control over which transport protocols are used. This is provided in a very flexible way, allowing predictable interaction with configuration settings made by a user so that the most desirable connection method will be employed when receiving streaming data. The configurable ability to try different transport protocols is especially useful when firewalls block various protocols when communicating outside the local network.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

What is claimed is:

1. A streaming multimedia rendering system comprising:
    a network client;
    a network server;
    a reference file available from the network server, the reference file containing a plurality of different resource specifiers, each resource specifier designating a transport protocol;
    the network client being configured to retrieve the reference file from the network server and to repeatedly attempt to establish a streaming data connection using the different resource specifiers until a streaming data connection is successfully established, wherein each attempt using a different resource specifier uses the transport protocol designated by that different resource specifier.

2. A streaming multimedia rendering system as recited in claim 1, wherein each resource specifier includes a network URL.

3. A streaming multimedia rendering system as recited in claim 1, wherein the network client is configurable by a user to allow a selected subset of available transport protocols, the network client being configured to override the selected subset of available transport protocols to attempting communications using the transport protocols designated by the different resource specifiers of the reference file.

4. A streaming multimedia rendering system as recited in claim 1, the transport protocols including multicast and unicast protocols.

5. A streaming multimedia rendering system as recited in claim 1, the transport protocols including UDP, TCP, and HTTP protocols.

6. A network client connected to receive streaming multimedia data from network sources, comprising:
    a data processor;
    the data processor being programmed to retrieve a reference file from a network source, the reference file containing a plurality of different resource specifiers, each resource specifier designating a transport protocol;
    the data processor being further programmed to repeatedly attempt to establish a streaming data connection using the different resource specifiers until a streaming data connection is successfully established, wherein each attempt using a different resource specifier uses the transport protocol designated by that different resource specifier.

7. A network client as recited in claim 6, wherein each resource specifier includes a network URL.

8. A network client as recited in claim 6, wherein the network client is configurable by a user to allow a selected subset of available transport protocols, the data processor being further programmed to override the selected subset of available transport protocols to attempting communications using the transport protocols designated by the different resource specifiers of the reference file.

9. A network client as recited in claim 6, the transport protocols including multicast and unicast protocols.

10. A network client as recited in claim 6, the transport protocols including UDP, TCP, and HTTP protocols.

11. A method of establishing a streaming data connection to a network client, comprising:
    receiving a resource reference from a network source, the resource reference including different transport protocols;
    repeatedly attempting to establish a streaming data connection using the different transport protocols until a streaming data connection is successfully established.

12. A method as recited in claim 11, wherein the resource reference designates a plurality network sources from which streaming multimedia data is available, the network sources corresponding respectively to the different transport protocols.

13. A method as recited in claim 11, wherein the network client is configurable by a user to allow a selected subset of available transport protocols, the method further comprising overriding the selected subset of available transport protocols to perform said attempting using the transport protocols including in the resource reference.

14. A method as recited in claim 11, the transport protocols including multicast and unicast protocols.

15. A method as recited in claim 11, the transport protocols including UDP, TCP, and HTTP protocols.

16. A computer-readable medium containing instructions that are executable by a computer to perform the method recited in claim 11.

17. A method of establishing a streaming data connection to a network client, comprising:

retrieving a reference file from a network source, the reference file containing a plurality of different resource specifiers, each resource specifier designating a streaming data resource and an associated transport protocol;

repeatedly attempting to establish a streaming data connection using the different resource specifiers until a streaming data connection is successfully established, wherein each attempt using a different resource specifier uses the streaming data resource and the associated transport protocol designated by that different resource specifier.

18. A method as recited in claim 17, wherein each resource specifier includes a network URL.

19. A method as recited in claim 17, wherein the network client is configurable by a user to allow a selected subset of available transport protocols, the method further comprising overriding the selected subset of available transport protocols to perform said attempting using the transport protocols designated by the resource specifiers.

20. A method as recited in claim 17, the transport protocols including multicast and unicast protocols.

21. A method as recited in claim 17, the transport protocols including UDP, TCP, and HTTP protocols.

22. A computer-readable medium containing instructions that embody a hyperlink-based network browser, the instructions being executable to perform the method recited in claim 17.

23. A computer-readable medium containing executable instructions for retrieving and viewing streaming multimedia content, the instructions comprising:

retrieving a reference file from a network source, the reference file containing a plurality of different resource specifiers, each resource specifier designating a streaming data resource and an associated transport protocol; receiving the streaming multimedia content over the streaming data connection and rendering the streaming multimedia content.

24. A method of establishing a streaming data connection to a network client, comprising:

retrieving a reference file from a network source, the reference file containing one or more resource specifiers, each resource specifier indicating a streaming data source and a protocol specifier;

repeatedly attempting to establish a streaming data connection using the different resource specifiers until a streaming data connection is successfully established, wherein each attempt using a different resource specifier uses the streaming data source and a transport protocol that corresponds to the protocol specifier indicated by that different resource identifier;

if a particular resource specifier has a protocol specifier having a predefined value, repeatedly attempting to establish a streaming data connection with the streaming data source specified by said particular resource specifier until a streaming data connection is successfully established, wherein each attempt uses a different transport protocol.

25. A computer-readable medium containing instructions that embody a hyperlink-based network browser, the instructions being executable to perform the method recited in claim 24.

26. A network computer client comprising a data processor that is programmed to perform the method as recited in claim 24.

27. A method of hyperlinking network clients to streaming multimedia data content, comprising:

creating a reference file with a plurality of different resource specifiers, each resource specifier designating a source of the streaming multimedia content and an associated transport protocol;

putting a hyper link to the reference file in a hypermedia document.

28. Computer-readable media comprising:

one or more sources of streaming multimedia content for downloading to network clients using different transport protocols;

a reference file with a plurality of different resource specifiers, each resource specifier designating one of the sources of the streaming multimedia content and an associated transport protocol for use in downloading the streaming multimedia content.

29. A network server system comprising:

one or more sources of streaming multimedia content for downloading to network clients using different transport protocols;

a storage medium containing a reference file with a plurality of different resource specifiers, each resource specifier designating one of the sources of the streaming multimedia content and an associated transport protocol for use in downloading the streaming multimedia content.

30. A computer-readable medium containing a reference file for downloading to network clients, the reference file comprising resource specifiers, each resource specifier designating a source of streaming multimedia content and an associated transport protocol for use in downloading the streaming multimedia content.

* * * * *

UNITED STATES PATENT AND TRADEMARK OFFICE
CERTIFICATE OF CORRECTION

PATENT NO.    : 6,415,327 B1
DATED         : July 2, 2002
INVENTOR(S)   : Beckerman It is certified that error appears in the above-identified patent and that said Letters Patent is hereby corrected as shown below:

Column 1,
Line 38, replace "users's" with -- user's --.

Column 2,
Line 15, replace "steaming" with -- streaming --.
Line 48, replace "includes" with -- included --.
Line 60, replace "provided." with -- provider. --.

Column 3,
Line 7, replace "unit 1" with -- until --.
Line 43, delete "a" after "includes".
Line 60, replace "severs" with -- servers --.

Column 4,
Line 44, replace "*.ask" with -- *.asx --.

Column 5,
Line 59, insert -- hyperlink to reference file 62 named "foo.asx". When a user activates this -- between "a" and "hyperlink".

Column 6,
Line 13, replace "preference" with -- preferences --.
Line 54, replace "Channel URL" with -- ChannelURL --.

Column 7,
Line 22, replace "comprise" with -- comprises --.
Line 26, replace "specifiers" with -- specifier --.
Line 35, insert -- source specified by said particular resource specifier until a streaming data -- between "data" and "connection".

Column 9,
Line 6, replace "including" with -- included --.

UNITED STATES PATENT AND TRADEMARK OFFICE
CERTIFICATE OF CORRECTION

PATENT NO. : 6,415,327 B1
DATED : July 2, 2002
INVENTOR(S) : Beckerman

It is certified that error appears in the above-identified patent and that said Letters Patent is hereby corrected as shown below:

Column 10,
Line 21, delete "as" after "method".

Signed and Sealed this

Third Day of December, 2002

JAMES E. ROGAN
*Director of the United States Patent and Trademark Office*